Patented May 29, 1951

2,554,973

UNITED STATES PATENT OFFICE 2,554,973

MODIFIED PARTIALLY HYDROLYZED POLYMERIC PRODUCTS OF THE CONDENSATION OF UNSATURATED ALDEHYDES AND ESTERS OF THE SAME

Seaver A. Ballard, Orinda, and Richard R. Whetstone, Berkeley, Calif., assignors to Shell Development Company, San Francisco, Calif., a corporation of Delaware No Drawing. Application August 2, 1946,
Serial No. 687,978

14 Claims. (Cl. 260—67)

This invention relates to novel esterifiable modified condensation products of unsaturated aldehydes, particularly of alpha,beta unsaturated aldehydes, and to the preparation of the same. More particularly, the present invention relates to condensation products of the unsaturated aldehydes, modified by means of mild hydrolysis, and mild oxidative treatment or mild reductive treatment, and to advantageous processes for effecting the condensation and modification.

The products provided by the present invention exhibit improved utility by virtue of their stability, chemical characteristics, and the like, over condensation products heretofore derived from aldehydes. They thus differ characteristically from products heretofore obtained, for example, by the known aldol condensation of aldehydes, by process in which condensation of the aldehydes is effected in a strongly basic medium, and other products similarly obtained. The novel products provided by the present invention are of particular advantage because of their improved stability in the presence of acids, as, for instance, acids present in either an aqueous medium or present as during resinification, for example, during the preparation of the well known class of resins known to the art as alkyd resins. Further characterization and advantageous properties of the products of the present invention will be referred to hereinafter.

In its broader aspects, the process of the present invention involves effecting reaction such as condensation, polymerization, etc., of one or more unsaturated aldehydes, preferably one or more alpha,beta olefinically unsaturated aldehydes, at an elevated temperature above about 125° C. to provide products containing more than an average of two aldehyde residues, or units, per molecule of reaction product; subjecting the reaction products thus obtained to mild hydrolytic treatment; and further modifying the partially hydrolyzed reaction products to promote development of esterifiable organic groups therein, as by subjecting the partially hydrolyzed reaction products to mild oxidative treatment or to mild reductive treatment. The present invention also includes within its scope the provision of improved resinous and other products comprising one or more of the herein described modified condensation products of aldehydes, and articles of manufacture comprising such products.

In accordance with the process of the present invention, one or more unsaturated aldehydes, preferably alpha,beta olefinically unsaturated aldehydes, are first reacted at an elevated temperature above about 125° C., to provide polymeric products of condensation containing on the average more than two aldehyde residues, or units, per molecule. Any unsaturated aldehyde may be used, and there may be employed either a single unsaturated aldehyde or mixtures of two or more unsaturated aldehydes in varying proportions. Preferably, however, there is employed in accordance with the process of the present invention, one or more unsaturated aldehydes having an unsaturated linkage between the carbon atoms in the alpha and beta positions in respect to a formyl group, the unsaturated linkage preferably being olefinic in character. The aldehydes employed in the process of the present invention thus may be characterized as preferably containing the structural unit:

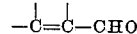

Representative alpha,beta unsaturated aldehydes suitable for use in the process of the present invention are, for example, acrolein, methacrolein, crotonaldehyde, alpha-ethylacrolein, alpha-methyl,beta-ethylacrolein, tiglic aldehyde, propargylic aldehyde, and analogous and homologous unsaturated aldehydes, and the like. One, or mixtures of more than one, of such aldehydes may be employed. It has been found that the alpha,beta olefinically unsaturated aldehydes which contain a terminal methylene group, i. e. acrolein, methacrolein and similar aldehydes which contain the structure

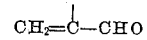

are of particular advantage in the process of the present invention because of ease of reaction, quality of products, etc. Their use therefore generally is most highly preferred.

The unsaturated aldehydes that have been found to be useful in accordance with the present invention may, if desired, contain one or more substituent groups such as halogen, hydroxyl, aryl, alkaryl, aralkyl, etc., provided such groups are of a character and in a position in the molecule not to interfere with the effective execution of the process. Unsaturated aldehydes containing more than one formyl and/or unsaturated linkages also may be employed, i. e. 2,4-hexadiene-1,6-dial, 2-hexene-1,6-dial, and similar unsaturated aldehydes.

In effecting the condensation, or polymerization, step of the process of the present invention, the unsaturated aldehyde is heated either by itself or in a reaction medium comprising one or more organic liquid media. A wide variety of organic liquid media may be employed, for instance, aromatic hydrocarbons, aliphatic hydrocarbons, chlorinated hydrocarbons, ethers, ketones, esters, solvents comprising alicyclic or heterocyclic organic compounds, etc. Preferably the liquid media are inert, i. e. they do not partake in the condensation or polymerization reaction under the conditions employed. The organic liquid medium, if one is employed, desirably is one in which both the unsaturated aldehyde and the product of condensation, polymerization, etc. are soluble, although liquid media in which the unsaturated aldehyde and/or the product of condensation, polymerization, etc. is sparingly soluble or insoluble may at times be employed if desired. Specific organic liquid media that may be employed advantageously in the present process are, for example, benzene, toluene, furan, acetone, xylene, the heptanes, the octanes, chloroform, dichlorethane, ethyl acetate, and the like. In general, however, highly satisfactory results may be obtained by heating the unsaturated aldehyde or aldehydes alone, that is, in the absence of any reaction medium other than that provided by the reactant aldehyde or aldehydes themselves.

The condensation, or polymerization, step of the present process is effected in the absence of any substantial proportion of water. Small amounts of water, such as may occur in the ordinary or commercial grades of the unsaturated aldehydes or of the organic liquid media, are not necessarily excluded since such minor amounts do not affect adversely the results obtained. Larger amounts, however, desirably are excluded. The first step of the present process thus is effected under substantially non-aqueous conditions. The use of substantially non-aqueous conditions in the first phase of the process, in conjunction with the elevated temperatures employed for the condensation, as hereinafter referred to, serves to distinguish the present process from prior treatments of unsaturated aldehydes at lower temperatures and/or in an essentially aqueous medium, the distinction arising not only in the reaction conditions employed but also in the improved characteristics of the final products obtained.

The relative proportions of unsaturated aldehydes and organic liquid medium, if one is employed, may be varied widely. Highly satisfactory results may be obtained in the presence of up to thirty or more parts of organic liquid medium per part of unsaturated aldehyde. Generally, however, it is preferred to employ an amount of organic liquid medium equal to or less than the amount of unsaturated aldehyde.

Catalysts may be employed to accelerate the rate of polymerization reaction, or to provide increased yields of the polymerization product under the conditions employed. Either inorganic or organic catalysts may be used, as, for example, metal salts, metals, small amounts of weak acids, small amounts of weak organic bases, such as amines, catalytically active neutral organic compounds, and the like. Catalysts such as certain metals or metal salts are of advantage because they frequently tend to be selectively active in accelerating the polymerization reaction without causing a proportional increase in other possible reactions. The use of suitable catalysts generally has the desirable result of increasing the relative conversion of unsaturated aldehyde to the desired polymeric reaction products. The catalyst either may be added as such, or may be formed in situ as by interaction between one or more of the components of the reaction mixture and a suitable added material, by decomposition of suitable materials added to the reaction mixture, and the like. Traces of catalyst up to substantial amounts, say from 0.001 per cent to 5 per cent or more of the total weight of reaction mixture may be employed. The use of an added catalyst during the initial step of the present process is not essential, however, and satisfactory results generally may be obtained by effecting the initial condensation in the absence of any added polymerization, or condensation, catalyst. The condensation, or polymerization, of the aldehyde preferably is effected in the presence of a small amount of any of the known antioxidants customarily employed for stabilizing unsaturated aldehydes against deterioration, for example, hydroquinone, benzoquinone, and similar phenolic compounds having stabilizing or antioxidant activity. The amount of such antioxidant or stabilizing compound used, if one is employed, determines to a certain extent the particular characteristics of the product of the present process. The products thus may be modified desirably within the scope of the invention either by omitting entirely such an antioxidant compound or by adding from in the neighborhood of 0.001 to about 4 per cent by weight of the unsaturated aldehyde of a suitable antioxidant compound. Particularly desirable results are obtained in the present process when the condensation, or polymerization, step is effected in the presence of from about 0.1 to about 2 per cent of an antioxidant compound, based on the weight of unsaturated aldehyde.

The condensation, or polymerization, reaction is effected by heating the unsaturated aldehyde, in the absence of or in the presence of one or more of the organic liquid media, catalysts, antioxidants, etc. hereinbefore referred to, to an elevated temperature preferably above about 125° C. Lower temperatures generally are not desirable. Considerably higher temperatures may be employed, the particular temperature depending in part upon the presence or absence of catalysts, antioxidants, etc. Generally temperatures not over about 275° C. are preferred, although higher temperatures may be employed at times if desired. Particularly advantageous results are obtained through the use of temperatures within the range of from about 190° C. to about 250° C. The reaction mixture preferably is heated under superatmospheric pressure, either autogenous as in a closed reaction vessel or applied, sufficient to maintain the reaction mixture in the liquid state at the temperature employed. Higher pressures, up to about 4,000 pounds per square inch or more may be applied if desired, the preferred range of pressures being from the vapor pressure of the reaction mixture at the temperature of reaction up to about 1,000 pounds per square inch.

The time of heating depends upon the other conditions of reaction, the catalyst, if any, and similar factors. Other conditions being equal, higher temperatures generally require shorter reaction times than do lower temperatures. Suitable catalysts may allow the use of significantly shorter reaction times to obtain any given extent of reaction. Longer reaction times under any given conditions tend to increase the extent of polymerization and also the amount of the unsaturated aldehyde that is converted to products containing more than two aldehyde residues per molecule, and therefore generally are desirable. Highly satisfactory conversion of unsaturated aldehyde to products of higher order than dimeric, i. e. containing on the average more than two aldehyde units per molecule, may be obtained, for example, with reaction times of from about 0.5 to about 4 hours, although it will be appreciated that the use of either longer or shorter reaction times to obtain the desired results falls within the scope of the invention.

The heating step of the present process may be effected either continuously, intermittently or batchwise.

The product of the polymerization step of the present process comprises in general a mixture of polymeric products of the unsaturated aldehyde of higher order of polymerization than dimeric, with any unreacted aldehyde and possible products of side or insufficient reaction, etc. The desired polymeric products may contain from an average of more than two up to an average of ten or more aldehyde units per molecule, that is, the polymeric products may contain per molecule from an average of more than two up to an average of ten or more times the number of carbon atoms as in the molecule of the unsaturated aldehyde that is employed, depending upon the reactants used, conditions and time of reaction, etc. In the preferred cases the polymeric products contain an average of more than three aldehyde residues or units per molecule. The polymeric products may range from viscous liquids to plastic solids. They may be separated from the reaction mixture by any suitable means, such as fractional distillation, extraction with selective solvents, selective precipitation from solution by addition of non-solvents, adsorption, etc. They possess a complex chemical structure that is apparently primarily polycyclic in character but in which free aldehyde groups and unreacted double bonds have been detected. Depending upon extent and manner of reaction, degree of purification, etc., the melting or boiling points of the polymerization products may be sharply defined or may extend over a considerable range. The polymerization products are substantially insoluble in water but may be dissolved in organic solvents such as acetone, benzene, etc.

In accordance with the process of the present invention, the polymeric products of the described polymerization treatment, either with or without separation from the reaction mixture or after any desired degree of purification, are subjected to a mild hydrolytic treatment, and further modified to promote the development in the products of partial hydrolysis, of esterifiable organic groups, i. e. of carboxyl or hydroxyl groups, as by mild oxidation or mild reduction, respectively. The hydrolytic treatment and the further modification may be effected separately or, if desired, concurrently. In either case, drastic hydrolytic treatment, i. e. treatment leading to substantial degradation or fission of the polymeric products to products of lower average molecular weight, is to be avoided. The hydrolytic treatment of the present invention leads to increased solubility of the polymeric products in water. The extent of hydrolysis therefrom may be conveniently determined by virtue of this change. However, other means such as chemical means may be employed for determining the sufficiency of the hydrolytic treatment, and it will be appreciated that reference herein to change in water solubility as a measure of the extent of hydrolysis of the polymeric products is primarily a matter of the convenience of this type of test rather than a limitation thereto.

In accordance with the process of the present invention, the polymeric products produced by the first step of the process are subjected to mild hydrolytic treatment sufficient to promote a substantial increase in the water solubility of the polymeric products but insufficient to promote substantial degradation or fission thereof into units of lower molecular weight. Preferably the hydrolytic treatment employed is sufficient to render the polymeric products substantially completely soluble in water, although less extensive hydrolytic treatment advantageously may be employed if desired. High favorable results thus have been obtained by the use of hydrolytic treatment sufficient to render the whole of the polymeric products at least about 50 per cent soluble in four parts by weight of water per part of total polymeric product. The hydrolytic treatment may be effected in any suitable way, such as by treatment with boiling water, with dilute or concentrated aqueous acids or bases, with steam, etc. In certain cases, however, alkaline hydrolytic conditions may have an adverse effect upon the products obtained, and it therefore generally is preferred to effect the mild hydrolysis under either neutral or acidic conditions. The use of dilute aqueous acids for effecting hydrolysis, preferably at an elevated temperature, enables the use of generally shorter times in the hydrolysis treatment and therefore is preferable. Treatment of the polymeric products to an extent equivalent to treatment with boiling water for from about 1 to 12 hours or more produces in general highly satisfactory results, the extent of hydrolysis being determined in any particular case by the duration of treatment, the temperature employed, the nature of the hydrolysis medium and the like. In the preferable cases, hydrolysis is effected to an extent equivalent to treatment with boiling water for from about 3 to about 7 hours. Acids, such as strong mineral acids, organic acids, acid salts or other acid reacting materials, etc., may be added to the water in concentrations up to about 5 normal, preferably however not over 0.1 normal, as accelerating agents for the partial hydrolysis of the polymeric products, the duration of treatment desirably being reduced in proportion to the resultant acceleration of the rate of hydrolysis. At lower temperatures, say 30° C. to 60° C., substantially greater concentrations of accelerating agents may be employed in the hydrolytic medium. The partial hydrolysis also may be hastened as by the use of superatmospheric pressure and correspondingly elevated temperatures. Temperatures below the boiling point of water, down to ordinary room temperatures or below, may be used, particularly when an accelerating agent is present, the duration of hydrolysis being regulated according to the temperature, amount of accelerating agent, etc.

The third step of the process of the present invention involves further modifying the partially hydrolyzed polymeric products as by either mild oxidative or mild reductive treatment, either during or after hydrolytic treatment, so as to promote the development of esterifiable organic groups in the products of partial hydrolysis.

Reduction of the partially hydrolyzed polymeric products may be effected in any suitable manner, either chemically, electrolytically, or by treatment of hydrogen, either molecular or nascent. The partially hydrolyzed polymeric products thus may be treated with any of a variety of reducing agents capable of reducing all or part of the free formyl groups present. A particularly convenient mode of procedure involves reducing, or hydrogenating, the products of partial hydrolysis by treatment with molecular hydrogen in the presence of a suitable hydrogenation catalyst, either during or after the hydrolytic treatment and either with or without removal of the aqueous medium of hydrolysis. Satisfactory catalysts for the hydrogenation treatment may comprise one or more of the noble metals, on an inert or catalytically active support, if desired, and the like. Other active hydrogenation catalysts may be used. A particularly suitable catalyst is the nickel catalyst known as Raney nickel and prepared according to the disclosures of the Raney patent, U. S. Patent 1,628,190. The Raney nickel catalyst may be added directly to the aqueous solution of the product of hydrolysis, either during or as formed by the hydrolysis treatment, and the whole subjected to molecular hydrogen under a pressure of from about 100 to about 5,000 pounds per square inch, preferably from about 500 to about 1,500 pounds per square inch, and at temperatures from about 50° C. to about 100° C. or higher. Lower or higher temperature and/or pressures may be employed if desired. Thus, from about 5 to about 50 parts, more or less, of hydrogenation catalyst may be suspended in or mixed with 100 parts of the aforesaid hydrolysis product before or after its separation from the aqueous medium, and the whole subjected to hydrogen gas under the foregoing conditions until the desired degree of hydrogenation is effected. Hydrogenation may be complete—until no more hydrogen is readily absorbed—or partial.

Reduction of the partially hydrolyzed polymeric material also may be effected as by treatment thereof in the presence of water or alcohol, etc. with metallic sodium, sodium amalgam, aluminum alcoholate, and similarly effective reducing agents. For example, a sodium-mercury amalgam containing from about 1 to about 10 per cent by weight of sodium, or equivalent metallic reducing agents, may be added slowly to an aqueous solution of the products of partial hydrolysis, with controlled addition of acid or buffer salts to prevent the formation of excessive alkalinity, the solution being agitated and addition of the amalgam being continued until the desired degree of reduction is obtained. Other means of treating the products of partial hydrolysis with the reducing agent may be employed.

A further advantageous means of effecting reduction of the partially hydrolyzed products of polymerization involves reduction by means of a bimetallic couple such as the zinc-copper or aluminum-mercury couple. Because the reduction may be effected in neutral solution, production of products of predetermined and controlled degree of hydrolysis is facilitated, the neutrality of the reducing medium minimizing possible further hydrolysis during the reduction treatment. The metal couple, prepared for example by treating finely divided metallic zinc with copper sulfate solution or by other known methods, may be added gradually to the partially hydrolyzed product in a dispersing medium such as ethyl alcohol, water, and the like, in an amount and for a time sufficient to effect the desired degree of reduction.

The hydrogenation or reduction process as effected in accordance with the present invention may be regarded as a mild reductive treatment, that is, as not conducive to drastic hydrogenolysis or other degradation of the products of partial hydrolysis.

Oxidation of the partially hydrolyzed polymeric products, as an alternative desirable means of effecting their modification, may be effected in accordance with the process of the present invention in any suitable manner, such as chemically, catalytically, or the like. Chemical oxidation may be effected by means of a wide variety of oxidizing agents, for example, sodium dichromate, potassium permanganate, silver oxide, hydrogen peroxide, organic peroxide, nitric acid, perchlorates ozone and similarly effective agents. In many cases partial hydrolysis and mild oxidation may be effected simultaneously. Thus, the polymeric material prepared, as hereinbefore described, may be treated with an acidic aqueous oxidizing medium adapted simultaneously to oxidize and to partially hydrolyze the condensation product. Alkaline aqueous oxidizing media may be employed similarly. For example, the condensation product may be added slowly to an aqueous solution of nitric acid while maintaining the temperature between about 30° C. and about 75° C., preferably between about 40° C. and about 60° C. There desirably is employed from about 0.1 to about 1, preferably from about 0.2 to about 0.6, gram-moles nitric acid in 50 to 80 per cent aqueous solution, per gram of polymerized unsaturated aldehyde. A stream of oxygen may be passed through the mixture during the reaction to remove and/or to prevent formation of undesired nitrogen oxides.

In place of the nitric acid, other suitable oxidizing agents may be employed in either alkaline or acid medium. If a neutral oxidizing medium is employed, hydrolysis of the condensation product preferably is effected prior to oxidative treatment.

Oxidation desirably may be effected catalytically, preferably in a neutral medium as by suspending a suitable catalyst in an alcoholic or aqueous dispersion of partially hydrolyzed condensation product and passing an oxygen-containing gas therethrough. Suitable catalysts are, for example, cobalt salts, manganese salts, vanadic acid, etc. From 1 to 50 per cent of catalyst, based on the weight of partially hydrolyzed condensation product, may be dispersed in a 5 to 50, preferably 10 to 25, per cent solution or dispersion of the partially hydrolyzed condensation product in a medum such as water, alcohol, etc., and oxygen, air, oxygen-enriched air, etc. blown therethrough at a rate adapted to provide the desired degree of oxidation. Temperatures of, for example, from about 50° C. to about 90° C. may be used effectively, although either higher or lower temperatures may be used. After the desired degree of oxidation is effected, the modified product may be recovered in any desired manner, as by extraction with immiscible solvents, fractional distillation, etc.

The oxidative treatment as effected according to the above methods or by equivalent means may be regarded as a mild oxidative treatment; in other words, not conducive to degradative oxidation of the intermediate products subjected thereto but, on the other hand, sufficient to promote the development of acidic esterifiable groups in the said intermediate products.

The modified partially hydrolyzed condensation products of unsaturated aldehydes provided by the present invention have the characteristics of complex polyhydric alcohols or complex polycarboxylic acids according to the use of reductive modification or oxidative modification, respectively, and may be referred to generically as esterifiable, modified products. They are primarily aliphatic in character, although the possible minor occurrence of cyclic structures is not precluded and is, in fact, even regarded as quite possible. Depending upon the extent and character of hydrolytic treatment and upon the reductive treatment employed, the polyhydric alcohols contain in the molecule an average of from somewhat less to slightly more than one hydroxylic group per monomeric aldehyde unit, the polyhydric alcohols produced under optimum conditions generally containing in excess of one hydroxyl group per monomeric aldehyde unit. They contain, in general, from an average of more than 2 up to an average of 10 or more monomeric aldehyde units per molecule, i. e. from an average of more than 2 to 10 or more times the number of carbon atoms per molecule as the molecule of the unsaturated aldehyde from which they are produced. The polycarboxylic acid products have titration curves characteristic of polycarboxylic acids containing carboxyl groups with different ionization constants. The polycarboxylic acid products generally contain slightly less than one carboxylic group per aldehyde residue in the molecule.

The modified products provided by the present invention are valuable products. The polyhydric alcohols may be used as plasticizers, tackifiers, etc. for plastic compositions, or they may be converted to derivatives of alcohols such as ethers, esters, etc., and the derivatives used in themselves for plastic compositions, synthetic lubricants, compounding ingredients for plastics, etc. The acids may be used as the free acids or as salts thereof, and find valuable application as mild acidifying agents, dispersing and emulsifying agents, plasticizers, tackifiers, etc. Esters and other derivatives of the acids may be prepared. The present polyhydric alcohols may be reacted with the present polycarboxylic acids, in the presence of other alcohols and/or acids if desired, to provide novel esterification products of wide applicability.

Among the many valuable applications of the present products there is the preparation of resins of the general type known as alkyd resins by reaction of either one or both of the polyhydric alcohol and the polycarboxylic acid products with polycarboxylic acids and/ or polyhydric alcohols, respectively. Polycarboxylic acids suitable for reaction with the polyhydric alcohol products of the present invention, or with the same and another polyhydric alcohol, may contain 2, 3, 4 or more carboxylic groups per molecule. They may be aliphatic, alicyclic, or aromatic in nature. They may be saturated or unsaturated. Examples of suitable polycarboxylic acids are malonic, succinic, glutaric, adipic, pimelic, suberic, azelaic, sebacic, maleic, maleic adducts of rosin, etc., fumaric, itaconic, malic, phthalic, isophthalic, citric, tricarballylic acids, and the like. Acid-acting compounds, such as esters, acid chlorides and acid anhydrides, can be used in place of the acids in many cases, if desired.

Part of the above-enumerated or other polycarboxylic acids may be replaced advantageously by the herein described novel polycarboxylic products derived from unsaturated aldehydes with desirable improvement in properties of the alkyd resinification product. Similarly, the herein described novel polyhydric alcohols may be reacted with the present novel acid products either as the sole polyhydric alcoholic reactant or in conjunction with other polyhydric alcohols such as any of the various glycols, glycerol, pentaerythritol, and the like.

The herein described novel polycarboxylic acid products advantageously may be esterified as the sole carboxylic material with one or more polyhydric alcohols to provide valuable new alkyd-type esterification products.

The herein described novel polyhydric alcohol and polycarboxylic acid products are of particular value in the production of the alkyd-type resin products because of their improved stability under the conditions of resinification.

Alkyd-type resins, in accordance with the present invention, can be produced by heating the reactants together in the presence or absence of diluents and/or catalysts by methods known in the art or by other ways. The resins can be produced in the fusible stage and, if desired, subsequently infusibilized as by the application of heat, etc. The alkyd resins of the invention are suitable for the preparation of varnishes, baking enamels, paints, lacquers, adhesives, films, filaments, cast articles, molded articles, etc.

The polyhydric alcohol products of the present invention also may be used advantageously to provide valuable, novel synthetic drying oils by esterification with monocarboxylic unsaturated acids or derivatives thereof, such as the acid anhydrides. Acid containing at least 16 carbon atoms per molecule and having an iodine number (Wijs) of at least 120, are preferred, many such acids being available and known in the art. Suitable unsaturated monocarboxylic acids which thus may be employed are, for example, linoleic acid, clupanodonic acid, linolenic acid, elaeostearic acid, and the like, as well as mixtures of acids containing these or other unsaturated acids, such as linseed oil acids, fish oil acids, sunflower oil acids, tung oil acids, and the like. Esterification may be effected directly, as by reaction between the polyhydric alcohol and the acid or acid anhydride, or indirectly as by ester interchange, or by other known or special methods. The synthetic drying oils may be modified as by inclusion and reaction of other acid materials, the present novel polycarboxylic acid products being particularly suitable therefor. Other means of modification, such as air blowing, heat bodying, and other methods employed in the art of drying oils also may be used, if desired.

Esters of the present novel polyhydric alcohols or polycarboxylic acids with the lower aliphatic carboxylic acids or lower aliphatic alcohols, respectively, may be prepared according to known esterification methods. The polyhydric alcohols provided by the present invention may be used advantageously in the preparation or modification of the "alcoholated" aminoplast resins such as the urea-formaldehyde, melamine-formaldehyde, and similar resins, with or without a second alcohol such as butyl alcohol, isopropyl alcohol, etc.

The following examples will serve to illustrate certain of the numerous possible specific embodiments of the present invention:

*Example I*

Acrolein containing 1 per cent by weight of hydroquinone was heated in a glass-lined reaction vessel at 170° C. for 3 hours and under autogenous pressure. The resultant mixture was fractionally distilled, and the fraction boiling at 140° C.–170° C. under 1 millimeter mercury pressure was separated. The material contained in this fraction was found to contain an average of 4.3 acrolein units per molecule and to contain one carbonyl group per molecule. It was water insoluble.

One part of the material thus separated was boiled with 4 parts of water for four hours, at which time 70 per cent had dissolved in the water. 0.07 parts by weight of Raney nickel catalyst then were suspended in the solution of partially hydrolyzed condensation product and the solution containing the catalyst was exposed, with agitation, to hydrogen at 50° C.–100° C. and under a hydrogen pressure of about 1000 pounds per square inch until hydrogen ceased to be absorbed. After removal of the catalyst and distillation of the water a viscous, water-soluble liquid was obtained which was found to contain 1.59 equivalents of hydroxyl per 100 grams.

*Example II*

A stream of acrolein containing 1 per cent hydroquinone was passed through a stainless steel reaction tube under a pressure of 700 to 750 pounds per square inch, at 220° C., and at a rate of 2.02 volumes acrolein per volume of reaction tube per hour. Lower boiling materials were separated from the polymeric condensation product by distillation up to 160° C. at 100 millimeters mercury pressure. The undistilled, polymeric condensation product was dissolved in acetone solution and purified by precipitation through addition of ether to the acetone solution, residual solvent being removed from the separated precipitate by fusion of the precipitated material at 140° C. to 160° C. under 5 millimeters' mercury pressure.

The polymeric condensation product was simultaneously partially hydrolyzed and oxidized by addition in the form of a fine powder to 0.4 gram-mole of 70% aqueous nitric acid per gram of condensation product, at such a rate that the reaction temperature was maintained at about 49° C. to 54° C. A slow stream of oxygen was passed through the reaction mixture during the addition of condensation product. After completion of reaction, the water and excess nitric acid were distilled off in vacuo.

A titration curve (potentiometric) of the polycarboxylic acid thus produced was characteristic of a mixture of organic acids in which the different carboxylic acid groups possess varying dissociation constants.

*Example III*

A 590-part sample of the polymeric product prepared by the continuous polymerization of Example II was dissolved in 390 parts acetone, and fractionated by addition of 1425 parts of diethyl ether and 200 parts of petroleum ether at about 0° C. After removal of precipitated material, the ethereal solution was evaporated to 300 parts of a very viscous liquid. This viscous liquid was dissolved in 475 parts of 95% ethanol, 145 parts of 0.02 N sulfuric acid solution and 320 parts water were added, and the mixture was heated at 70° C.–80° C. for 8.5 hours. After neutralization of the acid by addition of calcium carbonate and removal of the precipitated calcium sulfate, the solution was exposed to hydrogen gas at a maximum pressure of 1400 pounds per square inch and a maximum temperature of 150° C., in the presence of Raney nickel catalyst. After removal of the catalyst and solvent medium, 240 parts of a clear, water-soluble, viscous liquid remained, containing 1.73 equivalents of hydroxyl per 100 parts.

*Example IV*

One hundred sixty-five parts of the product of Example III were heated with 210 parts of phthalic anhydride for 3.5 hours at 170° C.–180° C., and then for 0.75 hour at 200° C. Upon cooling a hard, brittle, clear resinous solid was obtained. The product thus obtained was useful as an ingredient of surface coatings, as a component of resinous molding compositions, and as an impregnant of fibrous materials.

We claim as our invention:

1. A modified partially hydrolyzed polymeric product of the condensation of an unsaturated aldehyde under substantially non-aqueous conditions by the action of heat alone at a temperature of from about 125° C. to about 275° C., partially hydrolyzed to render the water-insoluble condensation product thus obtained at least about 50 per cent soluble in four parts by weight of water per part of total polymeric product, without substantial degradation of the polymer into units of lower molecular weight, modified to produce therein one of the esterifiable groups of the class consisting of the hydroxyl group and the carboxyl group.

2. A reductively modified partially hydrolyzed polymeric product of the condensation of an unsaturated aldehyde under substantially non aqueous conditions by the action of heat alone at a temperature of from about 125° C. to about 275° C., partially hydrolyzed to render the water-insoluble condensation product thus obtained at least about 50 per cent soluble in four parts by weight of water per part of total polymeric product, without substantial degradation of the polymer into units of lower molecular weight, reductively modified by catalytic hydrogenation to produce hydroxyl groups therein.

3. An oxidatively modified partially hydrolyzed polymeric product of the condensation of an unsaturated aldehyde under substantially non aqueous conditions by the action of heat alone at a temperature of from about 125° C. to about 275° C., partially hydrolyzed to render the water-insoluble condensation product thus obtained at least about 50 per cent soluble in four parts by weight of water per part of total polymeric product, without substantial degradation of the polymer into units of lower molecular weight, oxidatively modified to produce carboxyl groups therein.

4. A process of preparing a polyhydric alcohol which comprises subjecting to mild reduction a polymeric water-soluble product of partial hydrolysis of a water-insoluble product of the thermal condensation of an alpha,beta unsaturated aldehyde under substantially non-aqueous conditions at condensation temperatures from about 125° C. to about 275° C.

5. A process for the production of a polyhydric alcohol which comprises subjecting to partial hydrolysis the water-insoluble polymeric product of the thermal condensation of an unsaturated aldehyde under substantially non-aqueous conditions at condensation temperatures from about 125° C. to about 275° C., thereby converting said water-insoluble polymer to polymer that is at least about 50 per cent soluble in four parts by weight of water per part of polymer, and catalytically hydrogenating the product of partial hydrolysis.

6. The process of preparing polymeric ester-forming materials which comprises hydrolyzing the water-insoluble polymer produced by thermal condensation of an alpha,beta-unsaturated aldehyde under substantially non-aqueous conditions at temperatures of from about 125° C. to about 275° C., thereby converting said water-insoluble polymer to a polymer that is at least 50 per cent soluble in four parts by weight of water per part of polymer, and modifying the partially hydrolyzed polymer to produce therein one of the esterifiable groups of the class consisting of hydroxyl and carboxyl.

7. The process defined by claim 6 in which the alpha,beta-unsaturated aldehyde is acrolein.

8. A resinous material comprising the product of esterification reaction between (a) a polycarboxylic acid and (b) a polyhydric alcohol, said polyhydric alcohol being a reductively modified partially hydrolyzed polymeric product of the condensation of an unsaturated aldehyde under substantially non-aqueous conditions by the action of heat alone at a temperature of from about 125° C. to about 275° C., partially hydrolyzed to render the water-insoluble condensation product thus obtained at least about 50 per cent soluble in four parts by weight of water per part of total polymeric product, without substantial degradation of the polymer into units of lower molecular weight, reductively modified by catalytic hydrogenation to produce hydroxyl groups therein.

9. A resinous material comprising the product of esterification reaction between (a) a polyhydric alcohol and (b) a polycarboxylic acid, said polycarboxylic acid being an oxidatively modified partially hydrolyzed polymeric product of the condensation of an unsaturated aldehyde under substantially non-aqueous conditions by the action of heat alone at a temperature of from about 125° C. to about 275° C., partially hydrolyzed to render the water-insoluble condensation product thus obtained at least about 50 per cent soluble in four parts by weight of water per part of total polymeric product, without substantial degradation of the polymer into units of lower molecular weight, oxidatively modified to produce carboxyl groups therein.

10. A modified partially hydrolyzed polymeric product of the condensation of acrolein under substantially non-aqueous conditions by the action of heat alone at a temperature of from about 125° C. to about 275° C., partially hydrolyzed to render the water-insoluble condensation product thus obtained at least about 50 per cent soluble in four parts by weight of water per part of total polymeric product, without substantial degradation of the polymer into units of lower molecular weight, modified to produce therein one of the esterifiable groups of the class consisting of the hydroxyl group and the carboxyl group.

11. A reductively modified partially hydrolyzed polymeric product of the condensation of acrolein under substantially non-aqueous conditions by the action of heat alone at a temperaure of from about 125° C. to about 275° C., partially hydrolyzed to render the water-insoluble condensation product thus obtained at least about 50 per cent soluble in four parts by weight of water per part of total polymeric product, without substantial degradation of the polymer into units of lower molecular weight, reductively modified by catalytic hydrogenation to produce hydroxyl groups therein.

12. An oxidatively modified partially hydrolyzed polymeric product of the condensation of acrolein under substantially non-aqueous conditions by the action of heat alone at a temperature of from about 125° C. to about 275° C., partially hydrolyzed to render the water-insoluble condensation product thus obtained at least about 50 per cent soluble in four parts by weight of water per part of total polymeric product, without substantial degradation of the polymer into units of lower molecular weight, oxidatively modified to produce carboxyl groups therein.

13. A resinous material comprising the product of esterification reaction between (a) a polycarboxylic acid and (b) a polyhydric alcohol, said polyhydric alcohol being a reductively modified partially hydrolyzed polymeric product of the condensation of acrolein under substantially non-aqueous conditions by the action of heat alone at a temperature of from about 125° C. to about 275° C., partially hydrolyzed to render the water-insoluble condensation product thus obtained at least about 50 per cent soluble in four parts by weight of water per part of total polymeric product, without substantial degradation of the polymer into units of lower molecular weight, reductively modified by catalytic hydrogenation to produce hydroxyl groups therein.

14. A resinous material comprising the product of esterification reaction between (a) a polyhydric alcohol and (b) a polycarboxylic acid, said polycarboxylic acid being an oxidatively modified partially hydrolyzed polymeric product of the condensation of acrolein under substantially non-aqueous conditions by the action of heat alone at a temperature of from about 125° C. to about 275° C., partially hydrolyzed to render the water-insoluble condensation product thus obtained at least about 50 per cent soluble in four parts by weight of water per part of total polymeric product, without substantial degradation of the polymer into units of lower molecular weight, oxidatively modified to produce carboxyl groups therein.

SEAVER A. BALLARD.
RICHARD R. WHETSTONE.

REFERENCES CITED

The following references are of record in the file of this patent:

UNITED STATES PATENTS

| Number | Name | Date |
| --- | --- | --- |
| 1,984,417 | Marke et al. | Dec. 18, 1934 |
| 2,035,314 | Hansley et al. | Mar. 24, 1936 |
| 2,097,493 | Leuck et al. | Nov. 2, 1937 |
| 2,212,900 | Groll et al. | Aug. 27, 1940 |
| 2,345,138 | Machemer | Mar. 28, 1944 |

FOREIGN PATENTS

| Number | Country | Date |
| --- | --- | --- |
| 55,894 | Great Britain | Dec. 18, 1939 |

OTHER REFERENCES

Gilbert et al.: Journ. Amer. Chem. Soc., vol. 60, pages 1911–1914 (1938).